Feb. 11, 1930.  F. A. GRACE  1,746,392
CLUTCH MECHANISM

Filed June 2, 1927

INVENTOR
FRANK A GRACE
BY
*Jhing Harness*
ATTORNEY

Patented Feb. 11, 1930

1,746,392

UNITED STATES PATENT OFFICE

FRANK A. GRACE, OF NEWCASTLE, INDIANA

CLUTCH MECHANISM

Application filed June 2, 1927. Serial No. 195,940.

This invention relates to a clutch mechanism and more particularly to a clutch throw-out mechanism for use on a press or the like.

Heretofore presses have been provided in which a flywheel freely revolves on a shaft and thru the action of a control such as a foot treadle a connection is established between a jaw clutch and the flywheel thus imparting movement to the punch. The clutch is thrown into action by withdrawing a roller from contact with a cam permitting springs to force the jaws of the clutch together. After the roller or cam becomes worn the jaws of the clutch are permitted to strike one another while being held in disengaged position and this not only causes wear to the parts but very often the jaws engage enough to cause movement of the punch which is dangerous.

It is an important object of my invention to provide a means for positively holding the slidable jaws in disengaged position.

Another object of the invention is to provide a means for positively holding the slidable jaws in disengaged position regardless of the wear on the operating parts.

A further object is to connect the holding member with the clutch operating mechanism in such a manner that it is operated by the action of the clutch control.

These and other objects of the invention will more fully appear from the following description taken in connection with the accompanying drawings, in which.

Figure 1:
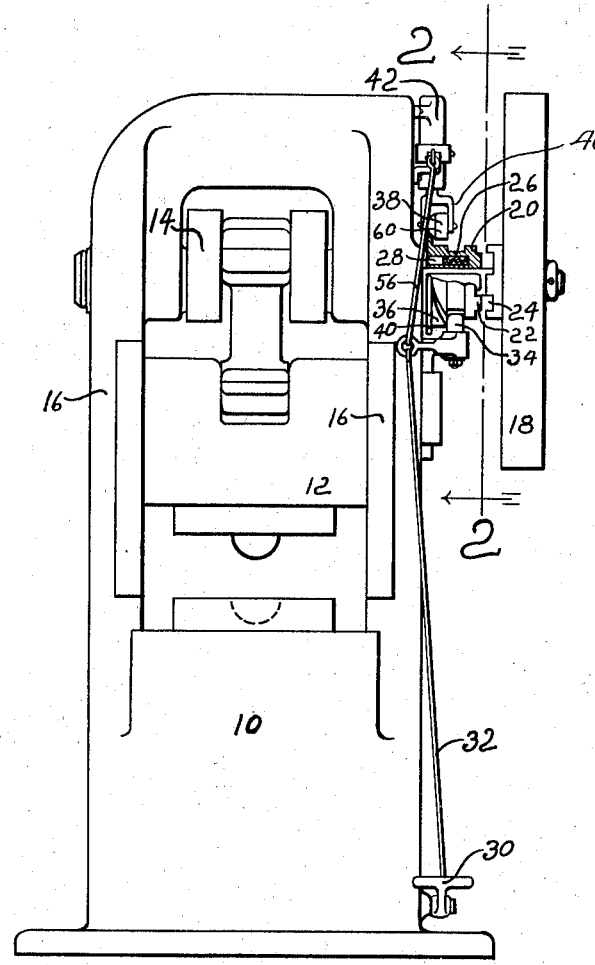
Fig. 1 is a front elevation of a conventional press showing an adaptation of my device.
Figure 2:
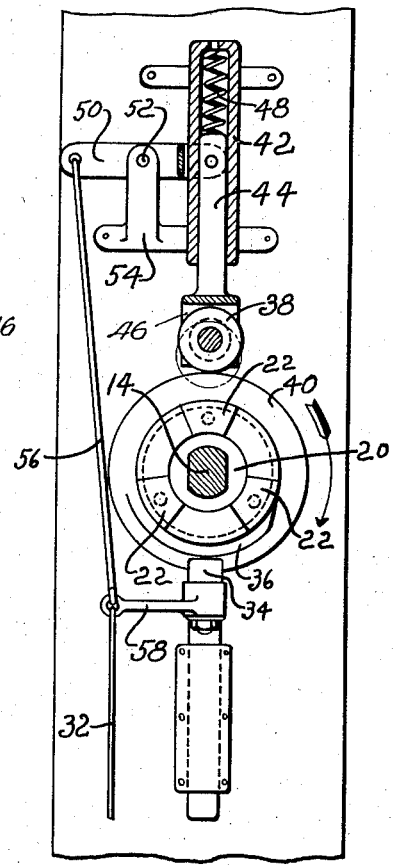
Fig. 2 is a side elevation of a portion of Fig. 1 showing on a larger scale the construction and arrangement of parts, parts being broken away and taken on line 2—2 of Fig. 1.

Referring to the drawings a conventional press has been shown having a base portion 10 and a reciprocating member 12 which is operated by a crankshaft 14 journaled in bearings in uprights 16. One end of the shaft 14 is extended to receive a flywheel 18 which freely revolves thereon and is driven by a source of power not shown. Mounted on the shaft 14 and adapted to rotate therewith is a slidable collar 20 having projections 22 at one end thereof adapted to engage depressions 24 in the hub of the flywheel 18, or a member adapted for rotation with the flywheel. When the collar is slid on the shaft to the right a driving connection is made between the flywheel and the shaft reciprocating the member 12 and when slid in the opposite direction the parts are disengaged and the flywheel revolves freely on the shaft. The collar 20 and member provided with the depressions 24 constitute a jaw clutch. Springs 26 shown mounted in the collar 20 abut against pins 28, which engage a thrust bearing surface on the support 16, and urge the collar to the right to engage the clutch.

The clutch is thrown into action by depressing a foot treadle 30 which thru a link 32 withdraws a roller 34 from contact with a cam 36 on the collar 20 permitting the springs 26 to force the collar into driving engagement with the flywheel. The cam has been arranged so that when the shaft has made a complete revolution and the foot treadle released it will force the collar 20 to the left thereby disengaging the clutch. When the cam 36 or roller 34 becomes worn it will be understood that the collar is not held as far away from the flywheel or driving member as originally provided for and often the jaws strike or engage enough to establish a driving connection therethru without depressing the foot treadle and when the operator does not so intend.

I have provided an inexpensive mechanism which may be readily attached to the conventional press for positively holding the collar 20 to the left while in disengaged position. The mechanism illustrated comprises a horizontally arranged conical roller 38 adapted to engage or disengage the edge of an annular flange 40 on the collar 20. A guide member 42 in the form of a cylinder is secured to the press frame or upright 16 and a rod 44, provided with a bifurcated end 46 to receive the roller 38, is adapted to slide vertically in the guide 42. A spring 48 urges the rod 44 downwardly and a lever 50 pivoted as at 52 to a bracket 54, which in turn is secured to the press frame, is pivotally connected to the rod 44. A link 56 connects the outer end of the lever 50 with an arm 58 to which is connected the foot treadle link 32 for controlling the roller.

When the foot treadle 30 is depressed the roller 34 is disengaged from the cam and the conical roller 38 is simultaneously raised from the flange 40 permitting the clutch to be engaged. If one revolution is desired the foot treadle is immediately released and an annular portion 60 of the roller 38 rides on the outer periphery of the annular flange 40. When the cam 36 causes the collar to slide to the left for disengaging the clutch the conical surface of the roller engages the side of the flange 40 positively holding it against the bearing surface on the upright 16.

It will be understood that the spring 48 urges the roller downwardly and the conical surface engages the flange 40 holding it in its extreme left position regardless of wear.

When it is desired to have the machine make more than one revolution the operator keeps the foot treadle depressed thereby continuously engaging the clutch and holding the conical roller out of engagement with the flange 40.

While one practical embodiment of my invention has been shown and specifically described it is to be understood that various changes such as size, shape and arrangement of parts may be made without departing from the spirit of my invention and it is not my intention to limit its scope other than by the terms of the appended claims.

What I claim is:

1. In a device of the class described, a driving member, an axially movable driven member adapted to engage said driving member, cam means for disengaging said members, an annular flange on said driven member, a conical roller having its axis parallel to the axis of said driven member adapted to engage said flange, and means for disengaging said roller when said driving and driven members are engaged.

2. A device of the class described comprising in combination, an axially movable clutch member, a flange on said clutch member, a roller having a cylindrical surface and a conical surface, and means for resiliently urging said roller toward said flange whereby its conical surface engages said flange when the clutch is in disengaged position and its cylindrical surface engages said flange when the clutch is in engaged position.

3. In a device of the class described, a driving member, an axially movable clutch member, means for engaging said clutch member with said driving member, a cam on said clutch member, a roller adapted to be brought into engagement with said cam for disengaging said clutch member, another roller having a conical surface adapted for engagement with said clutch member, means for moving said first mentioned roller, and means connecting with said last named means for moving said roller having a conical surface.

FRANK A. GRACE.